Patented June 28, 1938

2,121,954

UNITED STATES PATENT OFFICE 2,121,954

METHOD OF DEHYDRATING AQUEOUS ALCOHOLS

George Lewis Cunningham, Niagara Falls, N. Y., assignor to The Mathieson Alkali Works, Inc., New York, N. Y., a corporation of Virginia No Drawing. Application December 29, 1936, Serial No. 118,083

9 Claims. (Cl. 260—156)

This invention relates to an improved process for the production of anhydrous or absolute alcohols from hydrous mixtures of such alcohols. More particularly it relates to a simple and flexible method for the dehydration of hydrous alcohols whose boiling point at atmospheric pressure does not exceed about 125° C.

A wide variety of methods have been proposed which have been used with varying degrees of success in the past for the preparation of anhydrous alcohols. Many of these methods have involved the use of hygroscopic salts or salts which readily formed hydrates such as for example, $CaCl_2$ or $CaSO_4$ or $Na_2SO_4$. The use of glycerol alone or in combination with hygroscopic salts has also been proposed. The use of these agents has been unsatisfactory commercially due to a variety of causes. For example $CaCl_2$ unites chemically with alcohol to form addition compounds. The recovery of the dehydrating ingredients is frequently involved and expensive, necessitating an extensive outlay for equipment. These operations are cumbersome and commercially unsatisfactory. Reagents such as metallic calcium, aluminum or magnesium have been used with some success but have not been practical commercially.

The distillation method has been more successful than any of the foregoing examples. This involves conducting a distillation of an aqueous alcohol solution of an alkali in the presence of a liquid which yields an azeotropic mixture. This method permits considerable economy of operation, but its maximum efficiency is reached only on very large scale operations where continuous operation and close control can be economically applied.

The standard of excellence for many years for the removal of the last traces of $H_2O$ from hydrous alcohols has been metallic sodium. This is used successfully in the laboratory but certain economic and chemical difficulties have made its commercial use on a large scale inexpedient. These difficulties include such considerations as high cost of metallic Na and the difficulties of shipping and handling it, and the production of hydrogen and heat when used with hydrous alcohols thus introducing a serious fire and explosion hazard.

According to one embodiment of the present invention, I have provided a process which possesses all the advantages of the use of metallic Na but does not possess the attendant disadvantages. Large quantities of absolute alcohol including methyl, ethyl and isopropyl are used in industrial processes where even the presence or a trace of water renders the alcohol unfit for use. The process of the present invention affords a commercially satisfactory method of producing such alcohols.

My invention, when operated in its simplest form, involves reacting an aqueous alcohol with an alkali metal amalgam in the presence of electrically conducting but non-amalgamating contact electrodes in contact with the amalgam and the alcohol. The use of such contact electrodes in the formation of lower alcoholates is claimed in my copending application Serial No. 65,491, filed February 24, 1935. These electrodes may be used with advantage in the present instance since they cause the amalgam to react with the water to form the corresponding alkali metal hydroxide prior to reaction with the alcohol. For various reasons it is advantageous to use amalgams containing less than 1% of the alkali metal. While such amalgams will react with the water in the aqueous alcohol before reacting with the alcohol, the speed and efficiency of the reaction is materially increased by operation in the presence of the contact electrodes mentioned above. The reaction is continued until the number of alkali metal atoms in solution is slightly in excess of the number of water molecules originally present in the aqueous alcohol used, that is a molar quantity of alkali metal as amalgam not less than the molar quantity of water present is reacted with the aqueous alcohol. The alcohol solution is then separated from the amalgam layer, heated, and distilled to recover as a distillate the pure anhydrous alcohol in nearly 100% yield. The following example will serve to illustrate this method of operation:

Example I 250 parts (by weight) of aqueous ethyl alcohol containing 6.5 parts $H_2O$ are treated with .3% sodium amalgam, using a carbon contact electrode, until 10 parts of sodium have reacted. The solution is separated from the amalgam and 240 parts of anhydrous alcohol are distilled therefrom.

The residue from the distillation in the above example is largely NaOH. This may be returned to an electrolytic cell to produce more sodium amalgam, thus making the process cyclic and more economical.

According to a further embodiment of my invention, aqueous alcohols containing not more than four carbon atoms may be completely dehydrated without reacting the entire aqueous solution with the amalgam. In this method of operation a certain fraction of the alcohol to be dehydrated is treated according to the method described above with the exception that the reaction is caused to proceed further, by reaction of additional alkali metal, so that in addition to the hydroxide produced by reaction with the water present there is also produced a quantity of the corresponding alkali metal alcoholate. The quantity of alcoholate so produced should be sufficient to react with the entire amount of water present in the remainder of the aqueous alcohol. This treated fraction of the alcohol is then mixed with the remainder, the mixture heated and the entire quantity of anhydrous alcohol recovered from this mixture by distillation. The general reaction involved in the second step of this mode of operation may be typified as follows:

$$C_2H_5ONa + H_2O = C_2H_5OH + NaOH$$

Following is an illustrative example of the operation of my invention according to this embodiment.

Example II 250 parts of anhydrous methyl alcohol are reacted with .1% sodium amalgam using a steel alloy contact electrode until 15 parts of sodium have reacted. The methyl alcohol solution of sodium methylate so produced is separated and 1000 parts of hydrous methyl alcohol containing 11.5 parts of $H_2O$ are added to the separated alcohol solution. The resulting alcohol solution is distilled to recover as distillate 1238.5 parts of absolute methyl alcohol. 26 parts of sodium hydroxide is left in the still. This is returned to the amalgam cell to produce more sodium amalgam. 250 parts of the anhydrous alcohol is passed through the alcoholate cell and the cycle is repeated.

It will be apparent that, in practicing the present invention, the above-described two-step process can be initiated by using a small fraction of the anhydrous alcohol to prepare the alcoholate which in the second step reacts with the $H_2O$ of the aqueous alcohol to be dehydrated. In this case also the alkali residue may be returned in a cyclic operation to produce more fresh amalgam.

Alkali metal amalgams react with alcohols with decreasing energy and rapidity as the number of carbon atoms in the molecule increases, as the concentration of amalgam is decreased, and as the temperature is lowered. For various reasons, chemical and economic, therefore, it is not expedient to react alcohols containing more than four carbon atoms with alkali metal amalgams.

A further embodiment of the present invention overcomes this difficulty. According to this modification, aqueous alcohols containing four or more carbon atoms may readily be dehydrated. This is accomplished by a two-step process in which a lower alcohol, either hydrous or anhydrous having a fewer number of carbon atoms, but not more than four, is reacted with an alkali metal amalgam in the presence of a suitable contact electrode as described above to produce an alcoholic solution of the corresponding alcoholate. This solution is separated from the amalgam and an appropriate amount is added to the aqueous higher alcohol to be dehydrated. An amount of the alcoholate should be added such that there will be present one molecule of alcoholate for each molecule of water in the aqueous higher alcohol. The mixture is heated and the lower anhydrous alcohol distilled off first. On further distillation the higher alcohol comes off leaving behind a residue of NaOH. In commercial practice, this sodium hydroxide residue may then be returned to the amalgam cell as described above, and the lower anhydrous alcohol which distills off first may be recycled to the original reaction vessel in order to produce more of the alcoholate of the lower alcohol. For example, methyl alcohol may be reacted with sodium amalgam in the presence of some suitable contact electrode, such as graphite or castiron, until the solution contains upwards of 14% of sodium methylate. An appropriate amount of this alcoholic solution is added to aqueous tertiary amyl alcohol. The solution mixture is heated, anhydrous methyl alcohol distilling off first, followed by the desired anhydrous tertiary amyl alcohol, and leaving behind solid sodium hydroxide. A more detailed example will serve to illustrate further the operation according to this embodiment of my invention:

Example III 250 parts of anhydrous methyl alcohol are reacted with 0.7% sodium amalgam in the presence of a castiron grid until 15 parts of sodium have reacted. The alcohol solution is separated from the amalgam and added to 1000 parts of aqueous tertiary butyl alcohol containing 11.5 parts of $H_2O$. The reaction mixture is distilled. Anhydrous methyl alcohol distills off first, followed by the desired anhydrous tertiary butyl alcohol, leaving 26 parts of sodium hydroxide in the still.

It will be understood from the foregoing that the various butyl alcohols may be dehydrated by the described methods involving the direct action of the amalgam which includes the use of a portion of sodium butylate in butyl alcohol to dehydrate a larger portion of aqueous butyl alcohol; and also by the use of the alcoholate of a lower alcoholate as presented in Example III above. In general the lower reaction rate involved when the butyl alcohols are employed, causes the last described procedure as exemplified in Example III to be used with better advantage with butyl alcohols.

The alcohols which may be successfully dehydrated by my invention are those the boiling points of which at normal atmospheric pressure are not higher than about 125° C. One known method for the preparation of the alcoholates of the higher alcohols is to react the anhydrous alcohol with an alkali metal hydroxide, and then to distill off the water formed in the reaction. The typical reaction involved may be expressed as follows:

$$ROH + MOH = ROM + H_2O$$

where R represents the residue of mono or polyhydric alcohol and M represents an alkali or alkaline earth metal. In such operations, however, the "R" grouping must be relatively large and the boiling point of the alcohol ROH high in order to permit the $H_2O$ to be distilled from the mixture without any of the alcohol. In the process of the present invention the formation of alcoholate by this reaction is avoided, and the ROH is distilled away from the MOH without reacting with it to form the corresponding alcoholate and water. It has been found that alcohols whose boiling point is not higher than about 125° C. may be so distilled away from the hydroxide formed by the reaction between the alcoholate and water. Thus, the butyl alcohols and certain of the amyl alcohols, such as for example tertiary amyl alcohol (B. P. 102° C.) or methyl-propyl carbinol, a secondary amyl alcohol (B. P. 119° C.) may be successfully dehydrated by my process described above and illustrated in Ex. III. My invention, on the other hand, is not applicable to normal primary amyl alcohol (B. P. 138° C.).

I claim:
1. The method of dehydrating aqueous alcohols, wherein an aqueous alcohol is reacted with a molar quantity of alkali metal amalgam not less than the molar quantity of $H_2O$ originally present in the aqueous alcohol, said reaction being conducted in the presence of an electrically conducting but non-amalgamating electrode in contact with the amalgam and the alcohol, separating the alcoholic solution from the amalgam, heating the mixture, and recovering the thus formed anhydrous alcohol by distillation.

2. The method of dehydrating aqueous alcohols containing not more than four carbon atoms, wherein an aqueous alcohol containing not more than four carbon atoms is reacted with a molar quantity of alkali metal amalgam in excess of that necessary to react with the water present, said reaction being conducted in the presence of an electrically conducting but non-amalgamating electrode in contact with the amalgam and the alcohol, separating the alcoholic solution of the thus formed alkali metal hydroxide and alkali metal alcoholate, causing said solution to react with another portion of the aqueous alcohol containing not more than four carbon atoms, heating the mixture, and recovering the thus formed anhydrous alcohol by distillation.

3. The method of dehydrating aqueous alcohols containing not more than four carbon atoms, wherein an anhydrous alcohol having not more than four carbon atoms is reacted with an alkali metal amalgam in the presence of an electrically conducting but non-amalgamating electrode in contact with the amalgam and the alcohol, separating the alcoholic solution of the thus formed alcoholate, reacting it with the aqueous alcohol containing not more than four carbon atoms, heating the mixture, and recovering the thus formed anhydrous alcohol by distillation.

4. The method of dehydrating aqueous alcohols containing not less than four carbon atoms whose boiling point is less than about 125° C., wherein an aqueous alcohol having not more than four carbon atoms is reacted with a molar quantity of alkali metal amalgam in excess of that necessary to react with the water present, said reaction being conducted in the presence of an electrically conducting but non-amalgamating electrode in contact with the amalgam and the alcohol to form the corresponding alkali metal alcoholate, separating the alcoholic solution of the thus formed alcoholate, reacting it with the aqueous alcohol to be dehydrated which contains not less than four carbon atoms, heating the mixture, recovering the alcohol having not more than four carbon atoms by distillation, and recovering the desired anhydrous alcohol containing not less than four carbon atoms by further distillation.

5. The method of dehydrating aqueous alcohols containing not less than four carbon atoms whose boiling point is less than about 125° C., wherein an anhydrous alcohol containing not more than four carbon atoms is reacted with an alkali metal amalgam in the presence of an electrically conducting but non-amalgamating electrode in contact with the amalgam and the alcohol to form the corresponding alkali metal alcoholate, separating the alcoholic solution of the thus formed alcoholate, reacting it with the aqueous alcohol to be dehydrated which contains not less than four carbon atoms, heating the mixture, recovering the alcohol having not more than four carbon atoms by distillation, and recovering the desired anhydrous alcohol containing not less than four carbon atoms by further distillation.

6. The method of dehydrating aqueous alcohols containing not more than four carbon atoms, wherein an aqueous alcohol containing not more than four carbon atoms is reacted with a molar quantity of alkali metal amalgam not less than the molar quantity of $H_2O$ originally present in the aqueous alcohol, said reaction being conducted in the presence of an electrically conducting but non-amalgamating electrode in contact with the amalgam and the alcohol, separating the alcoholic solution from the amalgam, heating the mixture, recovering the thus formed anhydrous alcohol by distillation, and returning the alkali metal hydroxide residue to an electrolytic cell for further production of the alkali metal amalgam.

7. The method of dehydrating aqueous alcohols containing not more than four carbon atoms, wherein an aqueous alcohol containing not more than four carbon atoms is reacted with a molar quantity of alkali metal amalgam in excess of that necessary to react with the water present, said reaction being conducted in the presence of an electrically conducting but non-amalgamating electrode in contact with the amalgam and the alcohol, separating the alcoholic solution of the thus formed alkali metal hydroxide and alkali metal alcoholate, causing said solution to react with another portion of the aqueous alcohol containing not more than four carbon atoms, heating the mixture, recovering the thus formed anhydrous alcohol by distillation, and returning the alkali metal hydroxide residue to an electrolytic cell for further production of the alkali metal amalgam.

8. The method of dehydrating aqueous alcohols containing not more than four carbon atoms, wherein an anhydrous alcohol having not more than four carbon atoms is reacted with an alkali metal amalgam in the presence of an electrically conducting but non-amalgamating electrode in contact with the amalgam and the alcohol, separating the alcoholic solution of the thus formed alcoholate, reacting it with the aqueous alcohol containing not more than four carbon atoms, heating the mixture, recovering the thus formed anhydrous alcohol by distillation, and returning the alkali metal hydroxide residue to an electrolytic cell for further production of the alkali metal amalgam.

9. The method of dehydrating aqueous alcohols containing not less than four carbon atoms whose boiling point is less than about 125° C., wherein an anhydrous alcohol containing not more than four carbon atoms is reacted with an alkali metal amalgam in the presence of an electrically conducting but non-amalgamating electrode in contact with the amalgam and the alcohol to form the corresponding alkali metal alcoholate, separating the alcoholic solution of the thus formed alcoholate, reacting it with the aqueous alcohol to be dehydrated which contains not less than four carbon atoms, heating the mixture, recovering the alcohol having not more than four carbon atoms by distillation, returning said alcohol to further react with the alkali metal amalgam, recovering the desired anhydrous alcohol containing not less than four carbon atoms by further distillation, and returning the alkali metal hydroxide residue to an electrolytic cell for further production of the alkali metal amalgam.

GEORGE LEWIS CUNNINGHAM.